United States Patent
Furusawa et al.

(10) Patent No.: US 8,654,785 B2
(45) Date of Patent: Feb. 18, 2014

(54) TRANSMISSION CONTROL SYSTEM, SUBSCRIBER-SIDE COMMUNICATION DEVICE, AND OFFICE-SIDE COMMUNICATION DEVICE

(75) Inventors: Satoshi Furusawa, Chiba (JP); Akihiro Takahashi, Saitama (JP); Yasuyuki Kuroda, Chiba (JP); Shozo Yamada, Chiba (JP)

(73) Assignees: OF Networks Co., Ltd., Chiba (JP); Oki Electric Industry Co., Ltd., Tokyo (JP); Fujikura Ltd., Tokyo (JP)

( * ) Notice: Subject to any disclaimer, the term of this patent is extended or adjusted under 35 U.S.C. 154(b) by 583 days.

(21) Appl. No.: 12/926,903

(22) Filed: Dec. 16, 2010

(65) Prior Publication Data
US 2011/0150482 A1    Jun. 23, 2011

(30) Foreign Application Priority Data
Dec. 22, 2009    (JP) .................................. 2009-290211

(51) Int. Cl.
*H04J 3/00*    (2006.01)

(52) U.S. Cl.
USPC .......................................... 370/464; 717/168

(58) Field of Classification Search
None
See application file for complete search history.

(56) References Cited

U.S. PATENT DOCUMENTS

| | | | | |
|---|---|---|---|---|
| 2007/0133557 | A1* | 6/2007 | Lee et al. | 370/395.4 |
| 2007/0159987 | A1* | 7/2007 | Khan et al. | 370/256 |
| 2007/0268818 | A1* | 11/2007 | Sugihara | 370/216 |
| 2008/0120677 | A1* | 5/2008 | Bernard et al. | 725/129 |

FOREIGN PATENT DOCUMENTS

JP    2009-065575 A    3/2009

* cited by examiner

*Primary Examiner* — Kevin C Harper
(74) *Attorney, Agent, or Firm* — Rabin & Berdo, P.C.

(57) ABSTRACT

Provided is a subscriber-side communication device including a subscriber-side processing unit that continuously performs signal processing regardless of computer restart and includes a transmission processing unit that performs a data transmission process according to transmission control information contained in a received signal from the office-side communication device. Also provided is an office-side communication device including an office-side processing unit that continuously performs signal processing regardless of computer restart, and a transmission control information computing unit that computes transmission control information for each subscriber-side communication device, the office-side processing unit including a transmission control information storing unit that stores transmission control information of each subscriber-side communication device computed by the transmission control information computing unit, and a transmission control processing unit that performs a transmission control process with each subscriber-side communication device by using the transmission control information of each subscriber-side communication device stored in the transmission control information storing unit.

7 Claims, 7 Drawing Sheets

TRANSMISSION CONTROL SYSTEM, SUBSCRIBER-SIDE COMMUNICATION DEVICE, AND OFFICE-SIDE COMMUNICATION DEVICE

BACKGROUND OF THE INVENTION

1. Field of the Invention

The present invention relates to a transmission control system, a subscriber-side communication device and an office-side communication device, and is applicable to a transmission control system, a subscriber-side communication device and an office-side communication device that can normally keep main signal continuity even during CPU restart for software update or the like.

2. Description of the Related Art

An access network called Fiber To The Home (FTTH) using an optical fiber as a transmission channel is becoming widely used for the purpose of providing a high-speed and wideband broadband service to general public home. For provision of a broadband service via the FTTH, an optical access system called Passive Optical Network (PON) is frequently used.

The PON system employs an architecture that connects one Optical Line Terminal (OLT) on the office side and a plurality of Optical Network Units (ONUs) on the subscriber side in a one-to-many relationship by splitting one optical cable using an optical passive element called an optical splitter (e.g. an optical coupler etc.). By sharing an optical fiber and a communication device by a plurality of subscribers, it is possible to provide the FTTH service in an economically effective manner.

The PON system typically uses Wavelength Division Multiplexing (WDM) using different wavelengths for communication from OLT to ONUs and communication from ONUs to OLT. Further, because one fiber is shared by a plurality of ONUs, the interference of signals from the respective ONUs is avoided by using Time Division Multiple Access (TDMA), for example, in the communication from ONUs to OLT.

An access network using the PON system includes Gigabit Ethernet-PON (GE-PON) that uses a Gigabit Ethernet protocol and is standardized as IEEE Std 802.3ah. In the GE-PON, a control function called Multi-Point MAC Control (MPCP) is regulated for access control by the TDMA, and a control frame called a MAC Control frame is exchanged between OLT and ONUs to thereby implement the MPCP control.

In the MPCP, prior to communication between OLT and ONUs, a channel between the OLT and the ONUs is established by a process called Discovery Process. In the Discovery Process, a MAC Control frame for Discovery Process is exchanged between the OLT and the ONUs, thereby establishing a channel between the OLT and the ONUs. Further, for the TDMA control from the ONUs to the OLT, synchronization of time between the OLT and all the ONUs is done in the Discovery Process.

After establishing the channel, each ONU notifies an amount of data requested to be sent (requested transmission amount) to the OLT by using a Report frame, which is one of the MAC Control frame.

Receiving the requested amount of transmission of each ONU notified through the Report frame, the OLT notifies an amount of data allowed to be sent (allowable transmission amount) of each ONU and transmission start time to the ONU by using a Gate frame, which is one of the MAC Control frame.

The ONU sends a data frame to the OLT based on the allowable transmission amount and the transmission start time notified through the Gate frame.

Further, in the IEEE Std 802.3ah, a function related to Operations, Administration and Maintenance (OAM) between OLT and ONUs is regulated, and OAM information is communicated between OLT and ONUs by using a control frame called a Slow Protocol frame. For communication of OAM information between OLT and ONUs, after a channel by the MPCP is established, a channel for OAM information is established by the OAM discovery mechanism. After the channel for OAM information is established, periodical exchange of OAM information is monitored to thereby confirm the normality of the channel for OAM information.

The MPCP discovery process, the exchange of control information through the Gate frame and the Report frame after channel establishment, and the operations, administration and maintenance function which are described above are generally implemented by software processing by a CPU in a communication device that constitutes the PON system (see Japanese Unexamined Patent Publication No. 2009-65575).

SUMMARY OF THE INVENTION

However, for the software that is loaded on an OLT device and an ONU device, it is expected that software update, which generally involves CPU restart, often occurs for reasons such as functional update.

Therefore, during the CPU restart due to software update, a function of exchanging control information through the Gate frame and the Report frame after channel establishment is stopped, which disables the Gate frame and the Report frame to be sent and received between the OLT and the ONUs. This raises a concern that the continuity of a main signal frame is disabled.

Further, during the CPU restart due to software update, the operations, administration and maintenance function is stopped, which disables the channel for OAM information to be maintained. Further, in the communication device, because an operation that cuts the continuity of a main signal upon disconnection of the channel for operations, administration and maintenance is generally practiced, this raises a concern that the continuity of a main signal frame is disabled.

In light of the foregoing, it is desirable to provide a transmission control system, a subscriber-side communication device and an office-side communication device that can continue a communication service without interrupting the continuity of a main signal even during restart of a computer due to software update or the like in the communication device as described above.

According to a first exemplary aspect of the present invention, there is provided a subscriber-side communication device for sending and receiving data with an office-side communication device, which includes (1) a subscriber-side processing unit that continuously performs signal processing regardless of computer restart, wherein the subscriber-side processing unit includes (1-1) a transmission processing unit that performs a data transmission process according to transmission control information related to data transmission contained in a received signal from the office-side communication device.

According to a second exemplary aspect of the present invention, there is provided an office-side communication device for sending and receiving data with one or a plurality of subscriber-side communication devices connected, which includes (1) an office-side processing unit that continuously performs signal processing regardless of computer restart, and (2) a transmission control information computing unit that computes transmission control information related to data transmission for each of the one or plurality of subscriber-side communication devices, wherein the office-side processing unit includes (1-1) a transmission control information storing unit that stores transmission control information of each of the subscriber-side communication devices computed by the transmission control information computing unit, and (1-2) a transmission control processing unit that performs a transmission control process with each of the subscriber-side communication devices by using the transmission control information of each of the subscriber-side communication devices stored in the transmission control information storing unit.

According to a third exemplary aspect of the present invention, there is provided a transmission control system for sending and receiving data between an office-side communication device and one or a plurality of subscriber-side communication devices connected to the office-side communication device, wherein the office-side communication device includes (1) an office-side processing unit that continuously performs signal processing regardless of computer restart, and (2) a transmission control information computing unit that computes transmission control information related to data transmission for each of the one or plurality of subscriber-side communication devices, and the office-side processing unit includes (1-1) a transmission control information storing unit that stores transmission control information of each of the subscriber-side communication devices computed by the transmission control information computing unit, and (1-2) a transmission control processing unit that performs a transmission control process with each of the subscriber-side communication devices by using the transmission control information of each of the subscriber-side communication devices stored in the transmission control information storing unit.

According to a fourth exemplary aspect of the present invention, there is provided a transmission control system for sending and receiving data between an office-side communication device and one or a plurality of subscriber-side communication devices connected to the office-side communication device, wherein each of the one or plurality of subscriber-side communication devices includes (1) a subscriber-side processing unit that continuously performs signal processing regardless of computer restart and includes a transmission processing unit that performs a data transmission process according to transmission control information related to data transmission contained in a received signal from the office-side communication device, and (2) before instructing restart to one of the subscriber-side communication devices being a restart target, the office-side communication device stops monitoring of a channel established with the transmission processing unit of the subscriber-side communication device being the restart target.

According to the exemplary aspects of the present invention described above, it is possible to continue a communication service without interrupting the continuity of a main signal even during restart of a computer due to software update or the like in a communication device.

DETAILED DESCRIPTION OF THE EMBODIMENT(S)

(A) Embodiment

A transmission control system, a subscriber-side communication device and an office-side communication device according to an embodiment of the present invention is described hereinafter by way of illustration with reference to the drawings.

In this embodiment, the present invention is applied to a GE-PON system that uses a Gigabit Ethernet protocol for a PON system by way of illustration.

(A-1) Configuration of Embodiment

Figure 3:
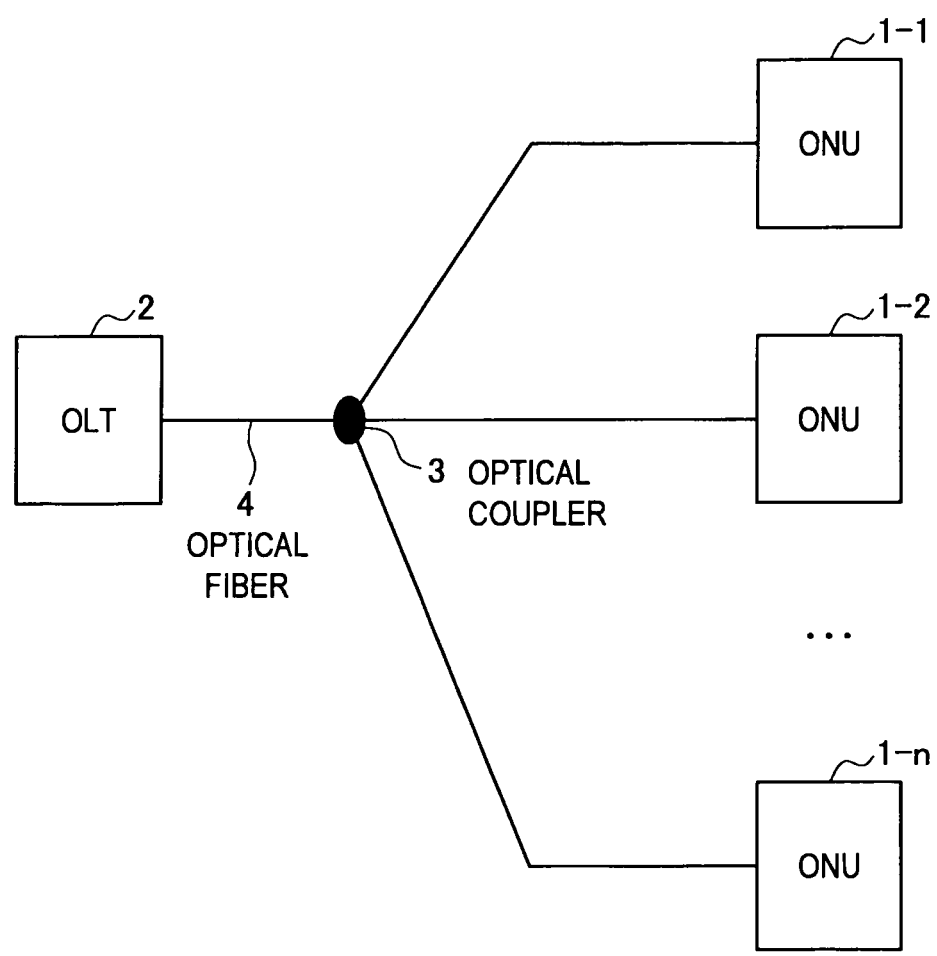
FIG. 3 is a view showing a configuration of a PON system.

FIG. 3 is a system configuration diagram that illustrates an overall configuration of a PON system according to the embodiment. Referring to FIG. 3, a PON system 5 according to the embodiment employs an architecture that connects one Optical Line Terminal device (OLT device) on the office side and a plurality of Optical Network Unit devices (ONU devices) 1-1 to 1-$n$ ($n$ is a positive integer) on the subscriber side in a one-to-many relationship by splitting one optical cable 4 using an optical passive element called an optical splitter (e.g. an optical coupler) 3.

Figure 1:
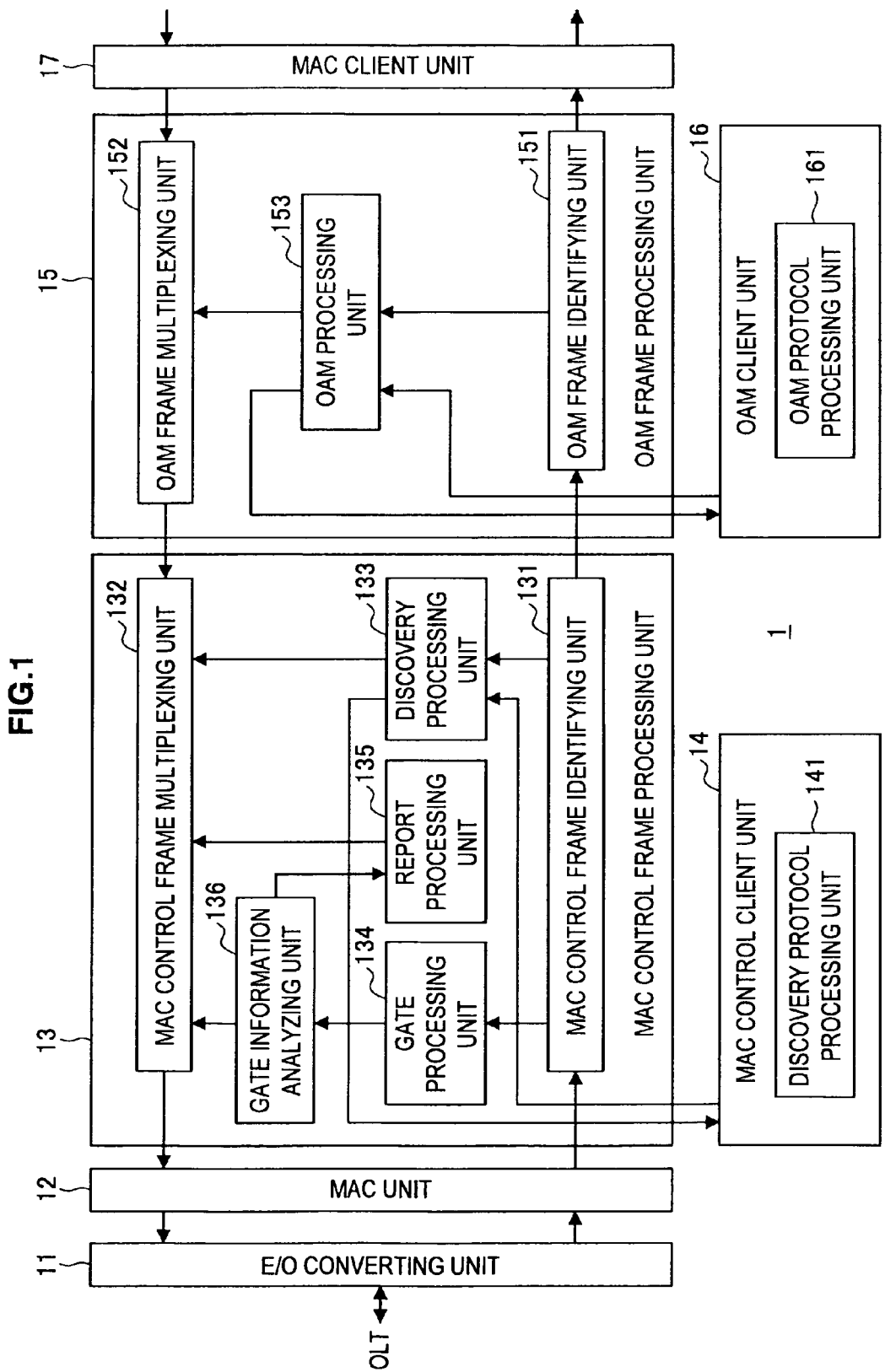
FIG. 1 is a functional diagram showing an internal configuration of an ONU device according to an embodiment.

FIG. 1 is a functional diagram showing an internal configuration of a subscriber-side Optical Network Unit device (ONU device) that constitutes the GE-PON system.

Referring to FIG. 1, the ONU device 1 at least includes an E/O converting unit 11, a Media Access Control (MAC) unit 12, a MAC Control frame processing unit 13, a MAC Control client unit 14, an OAM frame processing unit 15, an OAM client unit 16, and a MAC client unit 17.

In FIG. 1, the MAC Control client unit 14 and the OAM client unit 16 are functional units that are executed by software processing by a CPU, and the other components are functional units that are executed by hardware processing, for example.

The E/O converting unit 11 converts an input optical signal into an electrical signal and supplies the electrical signal to the MAC unit 12, and converts an electrical signal received from the MAC unit 12 to an optical signal and sends the optical signal.

The MAC unit 12 is equivalent to the lower sublayer of the Data Link Layer (the second layer) of the OSI Reference Model and has functions such as frame sending and receiving and error detection.

The MAC Control frame processing unit 13 is a circuit that extracts only a MAC Control frame from the frames received from the MAC unit 12 and performs analysis of the contents of the MAC Control frame and response according to the contents.

As shown in FIG. 1, the MAC Control frame processing unit 13 at least includes a MAC Control frame identifying unit 131, a MAC Control frame multiplexing unit 132, a Discovery processing unit 133, a Gate processing unit 134, a Report processing unit 135, and a Gate information analyzing unit 136.

The MAC Control frame identifying unit 131 identifies a frame called a MAC Control frame from the frames received by the MAC Control frame processing unit 13 and supplies the MAC Control frame to the Discovery processing unit 133 or the Gate processing unit 134, and supplies a frame different from the MAC Control frame to the OAM frame processing unit 15.

The MAC Control frame multiplexing unit 132 multiplexes a frame from the OAM frame processing unit 15 and the MAC Control frame from the Discovery processing unit 133 and the Report processing unit 135 and supplies the multiplexed frame to the MAC unit 12. The MAC Control frame multiplexing unit 132 is connected with the Gate information analyzing unit 136, and the output timing (transmission start time) of a frame and an amount of transmission data are directed from the Gate information analyzing unit 136.

The Discovery processing unit 133 performs the Discovery Process that establishes a channel with the ONU device 1. The Discovery processing unit 133 receives the extracted MAC Control frame for Discovery Process from the MAC Control frame identifying unit 131 and notifies the contents of the MAC Control frame for Discovery Process to the MAC Control client unit 14. Further, the Discovery processing unit 133 creates a MAC Control frame for Discovery Process based on Discovery Process information notified from the MAC Control client unit 14 and supplies the created MAC Control frame for Discovery Process to the MAC Control frame multiplexing unit 132.

The Report processing unit 135 creates a MAC Control frame for Report Process (Report frame) based on Report information notified from the Gate information analyzing unit 136 and supplies the Report frame to the MAC Control frame multiplexing unit 132.

The Gate processing unit 134 receives the extracted MAC Control frame for Gate Process (Gate frame) from the MAC Control frame identifying unit 131 and notifies the contents of the MAC Control frame for Gate Process (Gate information) to the Gate information analyzing unit 136.

The Gate information analyzing unit 136 computes transmission start time and an allowable transmission amount of a frame to be sent from the ONU device 1 based on the Gate information notified from the Gate processing unit 134 and notifies the result to the MAC Control frame multiplexing unit 132. Further, the Gate information analyzing unit 136 monitors an amount of data accumulated in the MAC Control frame multiplexing unit 132, computes Report information based on the accumulated amount of data accumulated in the MAC Control frame multiplexing unit 132 and the allowable transmission amount of the Gate information, and notifies the Report information to the Report processing unit 135.

The MAC Control client unit 14 includes a Discovery protocol processing unit 141.

The Discovery protocol processing unit 141 performs the processing of Discovery Process based on the MAC Control frame information notified from the Discovery processing unit 133 and notifies MAC Control frame information to be responded to the Discovery processing unit 133.

The OAM frame processing unit 15 at least includes an OAM frame identifying unit 151, an OAM frame multiplexing unit 152 and an OAM processing unit 153.

The OAM frame identifying unit 151 identifies a Slow Protocol frame from the frames output from the MAC Control frame processing unit 13 and supplies the Slow Protocol frame to the OAM processing unit 153. Further, the OAM frame identifying unit 151 supplies the other frames to the MAC client unit 17.

The OAM frame multiplexing unit 152 multiplexes a frame received from the MAC client unit 17 and the Slow Protocol frame from the OAM processing unit 153 and supplies the multiplexed frame to the MAC Control frame processing unit 13.

The OAM processing unit 153 receives the extracted Slow Protocol frame from the OAM frame identifying unit 151 and notifies the contents of the Slow Protocol frame to the OAM client unit 16. Further, the OAM processing unit 153 creates a Slow Protocol frame based on OAM information notified from the OAM client unit 16 and supplies the created Slow Protocol frame to the OAM frame multiplexing unit 152.

The OAM client unit 16 includes an OAM protocol processing unit 161.

The OAM protocol processing unit 161 receives the contents of the Slow Protocol frame from the OAM processing unit 153 and supplies OAM information according to the contents of the Slow Protocol frame to the OAM processing unit 153.

The MAC client unit 17 implements a bridge function or the like.

Figure 2:
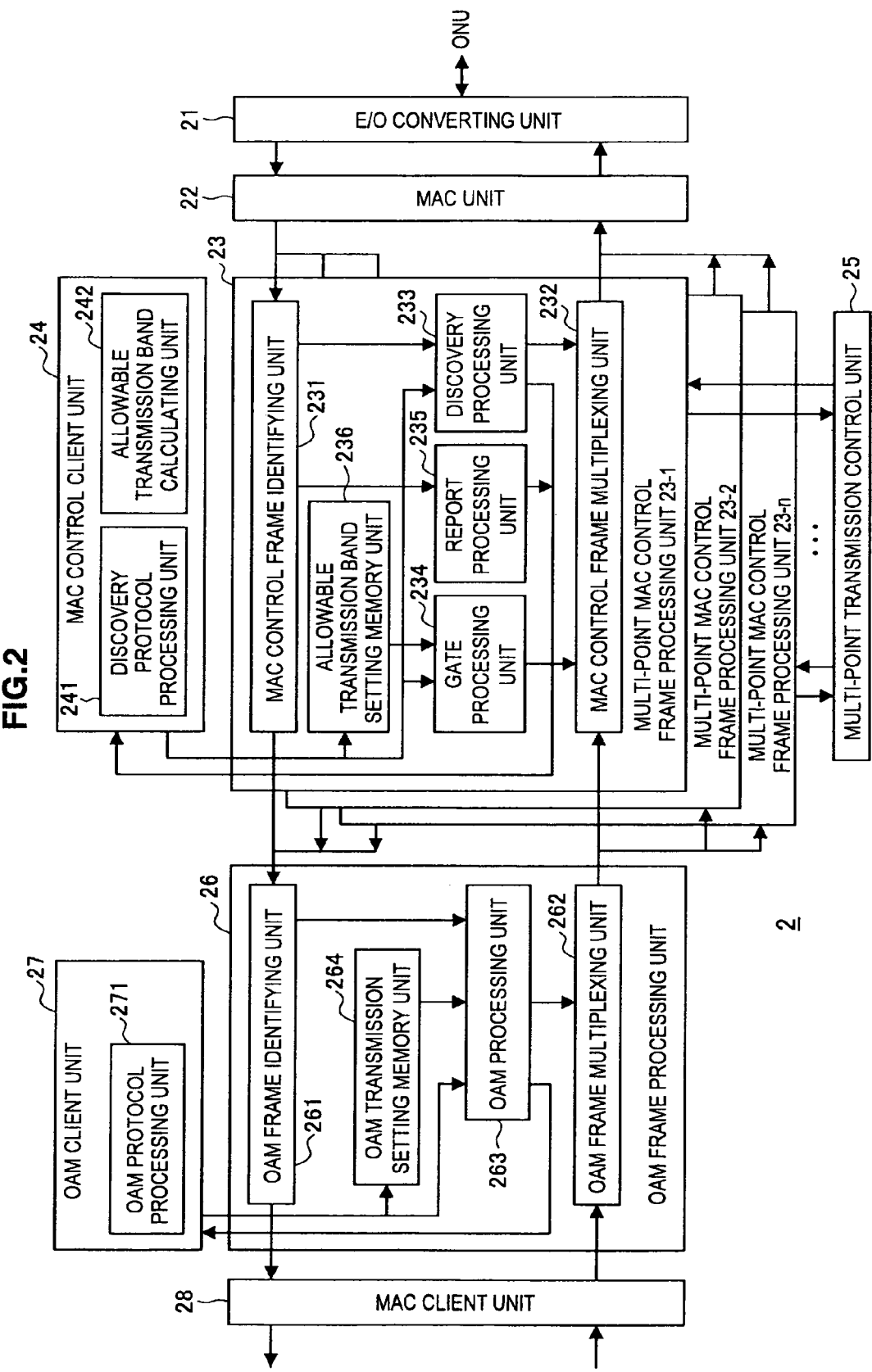
FIG. 2 is a functional diagram showing an internal configuration of an OLT device according to an embodiment.

FIG. 2 is a functional diagram showing an internal configuration of an office-side Optical Line Terminal (OLT device) that constitutes the GE-PON system.

Referring to FIG. 2, the OLT device 2 at least includes an E/O converting unit 21, a MAC unit 22, multi-point MAC Control frame processing units 23-1 to 23-$n$ ($n$ is a positive integer), a MAC Control client unit 24, a multi-point transmission control unit 25, an OAM frame processing unit 26, an OAM client unit 27 and a MAC client unit 28.

In FIG. 2, the MAC Control client unit 24 and the OAM client unit 27 are functional units that are executed by software processing by a CPU, and the other components are functional units that are executed by hardware processing, for example.

The E/O converting unit 21 converts an input optical signal into an electrical signal and supplies the electrical signal to the MAC unit 22, and converts an electrical signal received from the MAC unit 22 to an optical signal and sends the optical signal.

The MAC unit 22 is equivalent to the lower sublayer of the Data Link Layer (the second layer) of the OSI Reference Model and has functions such as frame sending and receiving and error detection.

The multi-point MAC Control frame processing units 23-1 to 23-$n$ are circuits that perform analysis and creation of a MAC Control frame exchanged with each ONU device 1. Further, the multi-point MAC Control frame processing units 23-1 to 23-$n$ exist separately for each of the ONU devices 1 connected to the OLT device 2.

The multi-point MAC Control frame processing units 23-1 to 23-$n$ at least include a MAC Control frame identifying unit 231, a MAC Control frame multiplexing unit 232, a Discovery processing unit 233, a Gate processing unit 234, a Report processing unit 235, and an allowable transmission band setting memory unit 236.

The MAC Control frame identifying unit 231 identifies a frame called a MAC Control frame from the frames received by the MAC unit 22 and supplies the MAC Control frame to the Discovery processing unit 233 or the Report processing unit 235, and supplies a frame different from the MAC Control frame to the OAM frame processing unit 26.

The MAC Control frame multiplexing unit 232 multiplexes a frame from the OAM frame processing unit 26 and the MAC Control frame from the Discovery processing unit 233 and the Gate processing unit 234 and outputs the multiplexed frame to the MAC unit 22.

The Discovery processing unit 233 receives the extracted MAC Control frame for Discovery Process from the MAC Control frame identifying unit 231 and notifies the contents of the MAC Control frame for Discovery Process to the MAC Control client unit 24.

Further, the Discovery processing unit 233 creates a MAC Control frame for Discovery Process based on Discovery Process information notified from the MAC Control client unit 24 and supplies the created MAC Control frame for Discovery Process to the MAC Control frame multiplexing unit 232.

The Report processing unit 235 receives the extracted Report frame from the MAC Control frame identifying unit 231 and notifies the contents of the Report frame to the MAC Control client unit 24.

The Gate processing unit 234 creates a Gate frame based on Gate information notified from the MAC Control client unit 24 and outputs the created Gate frame to the MAC Control frame multiplexing unit 232. Alternatively, the Gate processing unit 234 creates a Gate frame based on Gate information set to the allowable transmission band setting memory unit 236 and outputs the created Gate frame to the MAC Control frame multiplexing unit 232.

An operation of the Gate processing unit 234 is described hereinbelow. The Gate processing unit 234 can select any of the above operations depending on setting. For example, at the time of CPU restart, the Gate processing unit 234 creates a Gate frame using Gate information which is set to the allowable transmission band setting memory unit 236 by the MAC Control client unit 24. At the other time, the Gate processing unit 234 creates a Gate frame using Gate information which is notified from the MAC Control client unit 24.

Such switching of the operation of the Gate processing unit 234 can be triggered by the input of an instruction to initiate the restart of the OLT device 2, for example. Further, after completion of the restart, the Gate processing unit 234 can set the operation back from the processing using Gate information of the allowable transmission band setting memory unit 236 to the processing using Gate information notified from the MAC Control client unit 24.

The MAC Control client unit 24 includes a Discovery protocol processing unit 241 and an allowable transmission band calculating unit 242.

The Discovery protocol processing unit 241 performs the processing of Discovery Process based on the MAC Control frame information notified from the Discovery processing unit 233 of each of the multi-point MAC Control frame processing units 23-1 to 23-n, and notifies MAC Control frame information to be responded to the Discovery processing unit 233 of the corresponding multi-point MAC Control frame processing units 23-1 to 23-n.

The allowable transmission band calculating unit 242 calculates frame transmission start time and an allowable transmission amount of each ONU device 1 based on Report information notified from the Report processing unit 235 of each of the multi-point MAC Control frame processing units 23-1 to 23-n.

Further, the allowable transmission band calculating unit 242 notifies the calculated frame transmission start time and allowable transmission amount of each ONU device 1 as Gate information to the Gate processing unit 234 of the corresponding multi-point MAC Control frame processing units 23-1 to 23-n. Alternatively, the allowable transmission band calculating unit 242 notifies the calculated frame transmission start time and allowable transmission amount of each ONU device 1 as Gate information to the allowable transmission band setting memory unit 236.

As described above, the allowable transmission band calculating unit 242 calculates frame transmission start time and an allowable transmission amount of each of the ONU devices 1-1 to 1-n. The calculation of frame transmission start time and an allowable transmission amount of each of the ONU devices 1-1 to 1-n by the allowable transmission band calculating unit 242 may employ the same method as an existing technique. However, processing of notifying a calculation result of the allowable transmission band calculating unit 242 is as follows. For example, in the case of restart of the OLT device 2, the allowable transmission band calculating unit 242 sets the transmission start time and the allowable transmission amount of each of the ONU devices 1-1 to 1-n to the allowable transmission band setting memory unit 236 of the corresponding multi-point MAC Control frame processing units 23-1 to 23-n.

The allowable transmission band setting memory unit 236 stores the Gate information notified from the allowable transmission band calculating unit 242 of the MAC Control client unit 24. Further, the allowable transmission band setting memory unit 236 periodically notifies the stored Gate information to the Gate processing unit 234.

The multi-point transmission control unit 25 arbitrates requests for transmission from the respective multi-point MAC Control frame processing units 23-1 to 23-n and gives a permission for transmission to the MAC Control frame multiplexing unit 232 of each of the multi-point MAC Control frame processing units 23-1 to 23-n.

The OAM frame processing unit 26 at least includes an OAM frame identifying unit 261, an OAM frame multiplexing unit 262, an OAM processing unit 263 and an OAM transmission setting memory unit 264.

The OAM frame identifying unit 261 identifies a Slow Protocol frame from the frames output from each of the multi-point MAC Control frame processing units 23-1 to 23-n and supplies the identified Slow Protocol frame to the OAM processing unit 263 and supplies the other frames to the MAC client unit 28.

The OAM frame multiplexing unit 262 multiplexes a frame received from the MAC client unit 28 and the Slow Protocol frame from the OAM processing unit 263 and supplies the multiplexed frame to each of the multi-point MAC Control frame processing units 23-1 to 23-n.

The OAM processing unit 263 receives the extracted Slow Protocol frame from the OAM frame identifying unit 261 and notifies the contents of the Slow Protocol frame to the OAM client unit 27.

Further, the OAM processing unit 263 creates a Slow Protocol frame based on OAM information notified from the OAM client unit 27 and supplies the created Slow Protocol frame to the OAM frame multiplexing unit 262. Alternatively, the OAM processing unit 263 creates a Slow Protocol frame based on OAM information set to the OAM transmission setting memory unit 264 and supplies the created Slow Protocol frame to the OAM frame multiplexing unit 262.

An operation of the OAM processing unit 263 is described hereinbelow. The OAM processing unit 263 can select any of the above operations depending on setting. For example, at the time of restart of the OLT device 2, the OAM processing unit 263 creates a Slow Protocol frame using OAM information which is set to the OAM transmission setting memory unit 264 by the OAM client unit 27. At the other time, the OAM processing unit 263 creates a Slow Protocol frame using OAM information which is notified from the OAM client unit 27.

The OAM transmission setting memory unit 264 stores the OAM information notified from the OAM client unit 27. Further, the OAM transmission setting memory unit 264 periodically notifies the stored OAM information to the OAM processing unit 263.

The OAM client unit 27 includes an OAM protocol processing unit 271.

The OAM protocol processing unit 271 receives the contents of the Slow Protocol frame from the OAM processing unit 263 and supplies response information according to the contents of the Slow Protocol frame as OAM information to the OAM processing unit 263. Alternatively, the OAM protocol processing unit 271 sets OAM information according to the contents of the Slow Protocol frame received from the OAM processing unit 263 to the OAM transmission setting memory unit 264.

The MAC client unit 28 implements a bridge function or the like.

(A-2) Operation of Embodiment

An operation of a transmission control process in the GE-PON system according to the embodiment is described hereinbelow.

As shown in FIG. 3, a PON system is configured by connecting one or a plurality of ONU devices shown in FIG. 1 to the OLT device shown in FIG. 2 via the optical splitter (e.g. the optical coupler) 3.

(A-2-1) Information Transmission Process

An information transmission process between the OLT device 2 and the ONU device 1 is described hereinafter.

Figure 4:
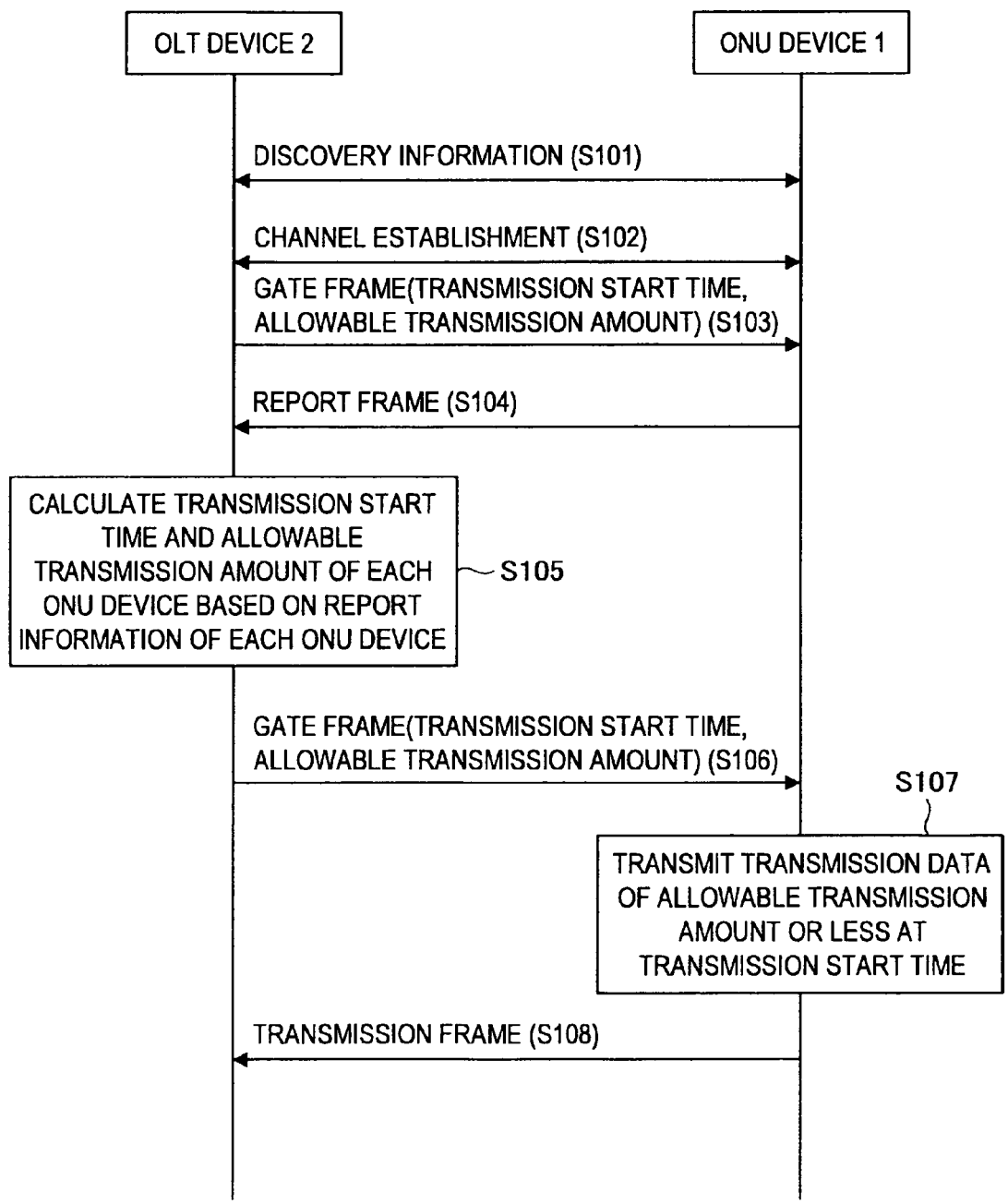
FIG. 4 is a sequence chart showing an information transmission process between an OLT device and an ONU device according to an embodiment.

FIG. 4 is a sequence chart showing an information transmission process between the OLT device 2 and the ONU device 1.

First, Discovery information is exchanged between the Discovery protocol processing unit 241 of the MAC Control client unit 24 of the OLT device 2 and the Discovery protocol processing unit 141 of the MAC Control client unit 14 of the ONU device 1 by using a MAC Control frame for Discovery Process to thereby complete Discovery Process (Step S101), and a channel between the OLT device 2 and the ONU device 1 is established (Step S102).

After the establishment of the channel between the OLT device 2 and the ONU device 1, communication from the ONU device 1 to the OLT device 2 follows the following procedure.

(1) Based on Report information notified from the ONU device 1, the OLT device 2 notifies transmission start time at which the ONU device 1 can start transmission and an amount of data which can be transmitted (allowable transmission amount) to the ONU device 1 through a Gate frame (Step S103).

Note that, because Report information from the ONU device 1 is not received initially, an allowable transmission amount enough to transmit a Report frame is given to the ONU device 1.

(2) The ONU device 1 sends Report information computed by the Gate information analyzing unit 136 on the basis of the amount of data accumulated in the MAC Control frame multiplexing unit 132 to the OLT device 2 through a Report frame from the Report processing unit 135 via the MAC Control frame multiplexing unit 132 and the MAC unit 12 (Step S104).

(3) The Report information of the Report frame received by the OLT device 2 is notified to the allowable transmission band calculating unit 242 of the MAC Control client unit 24 via the MAC unit 22, the MAC Control frame identifying unit 231 and the Report processing unit 235.

(4) Based on the notified Report information from each of the ONU devices 1-1 to 1-n, the allowable transmission band calculating unit 242 calculates frame transmission start time and an allowable transmission amount of each of the ONU devices 1-1 to 1-n (Step S105).

Then, the OLT device 2 sends the calculated frame transmission start time and allowable transmission amount of each of the ONU devices 1-1 to 1-n as Gate information to each of the ONU devices 1-1 to 1-n through a Gate frame from the Gate processing unit 234 via the MAC Control frame multiplexing unit 232 and the MAC unit 22 (Step S106).

(5) The Gate information of the Gate frame received by the ONU device 1 is notified to the Gate information analyzing unit 136 via the MAC unit 12, the MAC Control frame identifying unit 131 and the Gate processing unit 134.

(6) Based on the notified Gate information, the Gate information analyzing unit 136 extracts the frame transmission start time and the allowable transmission amount, and the MAC Control frame multiplexing unit 132 outputs a frame of the allowable transmission amount to the MAC unit 12 upon reaching the transmission start time (Steps S107 and S108).

After that, Steps S104 to S108 are repeated, thereby implementing the communication from the ONU device 1 to the OLT device 2.

Communication from the OLT device 2 to the ONU device 1 is implemented by the multi-point transmission control unit 25 that arbitrates requests for transmission from the respective multi-point MAC Control frame processing units 23-1 to 23-n of the OLT device 2 and controls the frame output from the multi-point MAC Control frame processing units 23-1 to 23-n.

Figure 5:
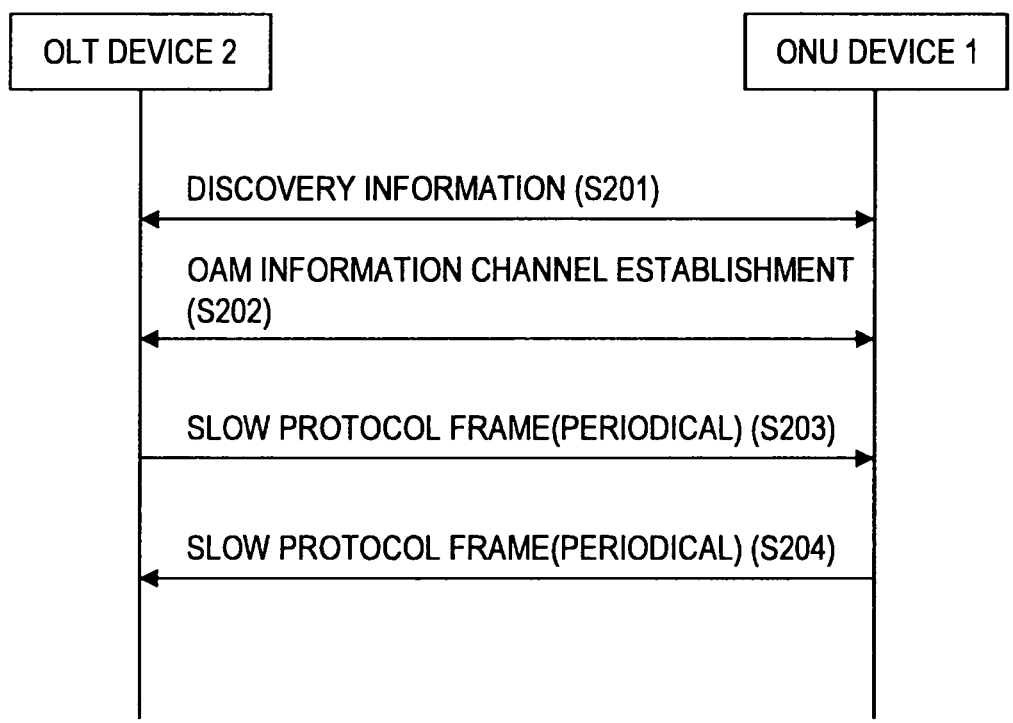
FIG. 5 is a sequence chart showing an OAM frame sending/receiving process between an OLT device and an ONU device according to an embodiment.

FIG. 5 is a sequence chart showing an OAM frame sending/receiving process between the OLT device 2 and the ONU device 1.

As shown in FIG. 5, after establishing a channel between the OLT device 2 and the ONU device 1, OAM information is exchanged between the OAM protocol processing unit 271 of the OAM client unit 27 of the OLT device 2 and the OAM protocol processing unit 161 of the OAM client unit 16 of the ONU device 1 by using a Slow Protocol frame to thereby complete OAM Discovery Process (Step S201), and a channel for operations, administration and maintenance (a channel for OAM information) between the OLT device 2 and the ONU device 1 is established (Step S202).

After the establishment of the channel for OAM information, the OLT device 2 performs periodical exchange of OAM information with each of the ONU devices 1-1 to 1-n and monitors the periodical exchange to thereby confirm the normality of the channel for OAM information (Steps S203 and S204).

(A-2-2) Process with Software Update of ONU Device 1

A procedure when the ONU device 1 in the state of the above (A-2-1) performs restart for software update is described hereinafter.

Figure 6:
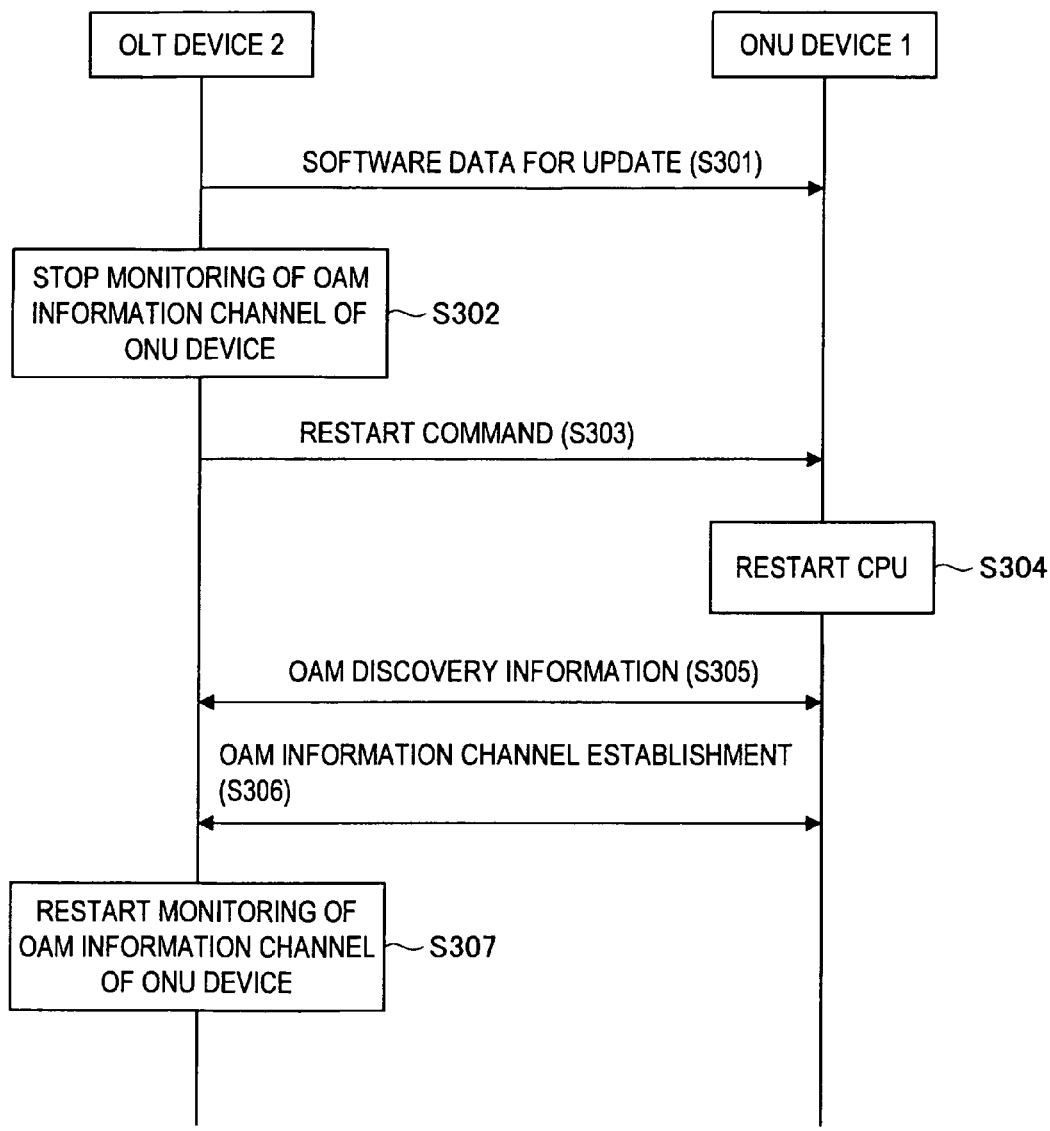
FIG. 6 is a sequence chart showing a process when performing CPU restart in an ONU device.

FIG. 6 is a sequence chart showing a process when performing CPU restart in the ONU device 1.

(1) The OLT device 2 transfers software data for update to the ONU device 1 (Step S301).

(2) The OLT device 2 stops monitoring of the channel for OAM information of the ONU device 1 which is a target of software update (Step S302). During the period when the monitoring of the channel for OAM information of the target ONU device 1 is stopped in the OLT device 2, the OLT device 2 does not discontinue communication regardless of the absence of the periodical OAM information from the target ONU device 1.

For example, the OAM client unit 27 notifies OAM information indicating the stop of the monitoring of the channel for OAM information of the software update target ONU device 1 to the OAM processing unit 263 or sets such information to the OAM transmission setting memory unit 264.

(3) The OLT device 2 instructs the CPU restart of the software update target ONU device 1 (Step S303). For example, the OLT device 2 sends a CPU restart command to the software update target ONU device 1.

(4) After completion of the restart of the ONU device 1 (Step S304), the OLT device 2 restarts the monitoring of the channel for OAM information of the software update target ONU device 1 (Steps S305 to S307).

For example, after the CPU restart of the ONU device 1, OAM information is exchanged between the OAM protocol processing unit 271 of the OAM client unit 27 of the OLT device 2 and the OAM protocol processing unit 161 of the OAM client unit 16 of the ONU device 1 by using a Slow Protocol frame to thereby complete OAM Discovery. Process (Step S305), and a channel for OAM information is established between the OLT device 2 and the ONU device 1 (Step S306). The OLT device 2 can thereby monitor the channel for OAM information with the software update target ONU device 1.

According to the above procedure, because the monitoring of the channel for OAM information is stopped during the CPU restart of the ONU device 1, the OLT device 2 does not discontinue the communication with the ONU device 1 during that period, and no effect is caused on the communication between the OLT device 2 and the ONU device 1.

Further, because the Gate information processing and the Report information processing in the ONU device 1 are hardware processing, the communication is not affected by the CPU restart.

(A-2-3) Process with Software Update of OLT Device 2

A procedure when performing software update of the OLT device 2 in the state of the above (A-2-1) is described hereinafter.

Figure 7:
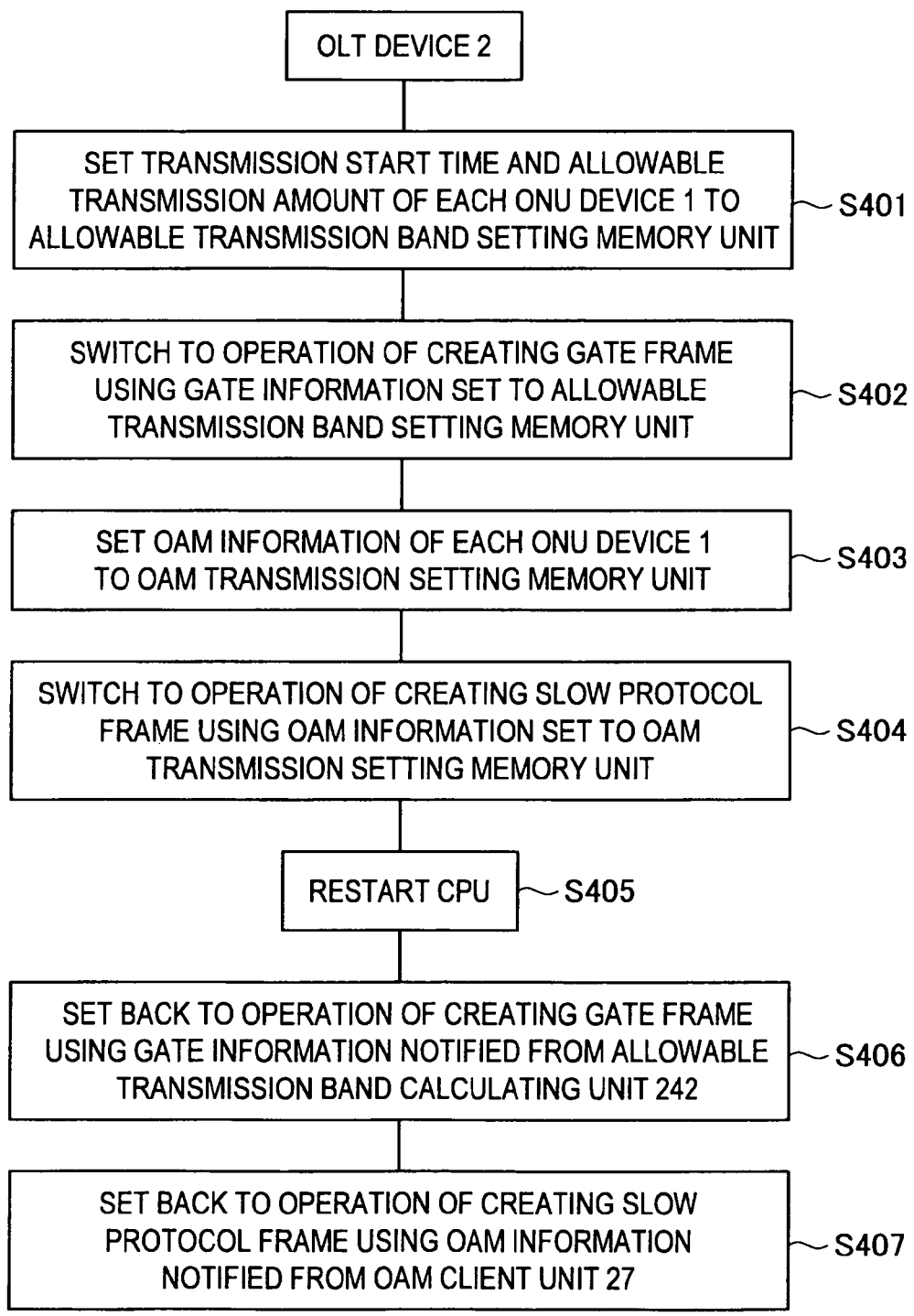
FIG. 7 is a flowchart showing a process when performing CPU restart in an OLT device.

FIG. 7 is a flowchart showing a process when performing CPU restart in the OLT device 2.

(1) When updating software in the OLT device 2, the allowable transmission band calculating unit 242 of the MAC Control client unit 24 sets transmission start time and an allowable transmission amount designated to each ONU device 1 to the allowable transmission band setting memory unit 236 (Step S401).

(2) In the OLT device 2, the operation of the Gate processing unit 234 is switched from the operation of "creating a Gate frame based on Gate information notified from the allowable transmission band calculating unit 242 of the MAC Control client unit 24 and outputting the Gate frame" to the operation of "creating a Gate frame based on Gate information set to the allowable transmission band setting memory unit 236 and outputting the Gate frame" (Step S402).

(3) Further, the OAM client unit 27 sets OAM information designated to each ONU device 1 to the OAM transmission setting memory unit 264 (Step S403).

(4) In the OLT device 2, the operation of the OAM processing unit 263 is switched from the operation of "creating a Slow Protocol frame based on OAM information notified from the OAM client unit 27 and outputting the Slow Protocol frame" to the operation of "creating a Slow Protocol frame based on OAM information set to the OAM transmission setting memory unit 264 and outputting the Slow Protocol frame" (Step S404).

Note that the case of switching the operation of the OAM processing unit 263 after switching the operation of the Gate processing unit 234 is illustrated in FIG. 7 for convenience of description, it is not limited to this sequence. For example, the both switching processes may be performed in parallel, or the operation of the Gate processing unit 234 may be switched after switching the operation of the OAM processing unit 263.

(5) Software of the OLT device 2 is updated, and a CPU is restarted (Step S405).

(6) In the OLT device 2 after completion of the CPU restart, the operation of the Gate processing unit 234 is switched back to the operation of "creating a Gate frame based on Gate information notified from the allowable transmission band calculating unit 242 of the MAC Control client unit 24 and outputting the Gate frame" (Step S406), and the operation of the OAM processing unit 263 is switched back to the operation of "creating a Slow Protocol frame based on OAM information notified from the OAM client unit 27 and outputting the Slow Protocol frame" (Step S407).

According to the above procedure, because the OAM information set to the OAM transmission setting memory unit 264 is periodically notified to each ONU device 1 during the CPU restart of the OLT device 2, the normality of the channel for OAM information is kept in each ONU device 1, and the ONU device 1 does not discontinue the communication with the OLT device 2 during that period. Therefore, no effect is caused on the communication between the OLT device 2 and the ONU device 1 during that period.

Further, because the Gate information set to the allowable transmission band setting memory unit 236 is periodically notified to each ONU device 1 during the CPU restart, although the dynamic Gate information notifying function that reflects Report frame from each ONU device 1 does not work during that period, no effect is caused on the communication between the OLT device 2 and the ONU device 1.

In the case where discontinuation of communication occurs for some reason during the CPU restart of the OLT device 2 or the ONU device 1, the communication can be recovered by starting with MPCP Discovery Process after the CPU restart.

(A-3) Advantage of Embodiment

According to the above-described embodiment, with incorporation of the Gate information analyzing unit 136 by hardware into the ONU device 1 and incorporation of the function of periodically outputting preset Gate information and OAM information by hardware into the OLT device 2, by performing a software update process in the specified procedure, it is possible to continue a communication service without interrupting the main signal continuity between the OLT device 2 and the ONU device 1 even during CPU restart due to software update of the ONU device 1 and the OLT device 2.

(B) Other Embodiments (B-1) Although the GE-PON system that uses a Gigabit Ethernet protocol for a PON system is described by way of illustrating in the above embodiment, the same advantage can be obtained when the present invention is applied to another PON system, not particularly limited to the GE-PON system.

Further, the same advantage can be obtained also when the present invention is applied to a communication device that performs similar communication control between at least two devices, not particularly limited to the PON system.

(B-2) Although it is described that, in the ONU device 1 shown in FIG. 1, the MAC Control client unit 14 and the OAM client unit 16 are implemented by software processing and the other components are implemented by hardware processing, they are not limited to be implemented by hardware processing as long as they can operate without being affected by CPU restart on the ONU device 1.

The present application contains subject matter related to that disclosed in Japanese Priority Patent Application JP 2009-290211 filed in the Japan Patent Office on Dec. 22, 2009, the entire content of which is hereby incorporated by reference.

What is claimed is:

1. A subscriber-side communication device for sending and receiving data over a channel with an office-side communication device, comprising:
   an operation information supplying unit that supplies operation information in accordance with a control frame received from the office-side communication device; and
   a subscriber-side processing unit that periodically transmits the operation information over the channel to the office-side communication device, to thereby keep a normality of the channel,
   wherein the subscriber-side processing unit includes a transmission processing unit that performs, by hardware, data transmission with the office-side communication device during a computer restart for a software update.

2. An office-side communication device for sending and receiving data over a channel with at least one subscriber-side communication device connected thereto, comprising:
   a transmission control information computing unit that computes transmission control information related to data transmission for each of the at least one subscriber-side communication device; and
   an office-side processing unit that periodically transmits the transmission control information over the channel to said each subscriber-side communication device, to thereby keep a normality of the channel,
   wherein the office-side processing unit includes:
      a transmission control information storing unit that stores the computed transmission control information for the at least one subscriber-side communication device, and
      a transmission control processing unit that performs, by hardware, a transmission control process with each of the at least one subscriber-side communication device during a computer restart for a software update by using the stored transmission control information.

3. A transmission control system, comprising:
   an office-side communication device and at least one subscriber-side communication device connected to the office-side communication device, wherein the office-side communication device includes
      a transmission control information computing unit that computes transmission control information related to data transmission for each of the at least one subscriber-side communication device, and
      an office-side processing unit that periodically transmits the transmission control information over a channel to said each subscriber-side communication device, to thereby keep a normality of the channel, the office-side processing unit including:
         a transmission control information storing unit that stores the computed transmission control information for the at least one subscriber-side communication device, and
         a transmission control processing unit that performs, by hardware, a transmission control process with each of the at least one subscriber-side communication device during a computer restart for a software update by using the stored transmission control information.

4. A transmission control system for sending and receiving data between an office-side communication device and one or a plurality of subscriber-side communication devices connected to the office-side communication device, wherein
   each of the one or plurality of subscriber-side communication devices includes a subscriber-side processing unit that continuously performs signal processing regardless of computer restart and includes a transmission processing unit that performs a data transmission process according to transmission control information related to data transmission contained in a received signal from the office-side communication device, and
   before instructing restart to one of the subscriber-side communication devices being a restart target, the office-side communication device stops monitoring of a channel established with the transmission processing unit of the subscriber-side communication device being the restart target.

5. The subscriber-side communication device of claim 1, wherein the operation information supplying unit supplies the operation information by executing software instructions.

6. The office-side communication device of claim 2, wherein the transmission control information computing unit computes the transmission control information by executing software instructions.

7. The transmission control system of claim 3, wherein the transmission control information computing unit computes the transmission control information by executing software instructions.

* * * * *